(No Model.)
W. B. STEELES.
CUTLERY HANDLE.
No. 570,346. Patented Oct. 27, 1896.
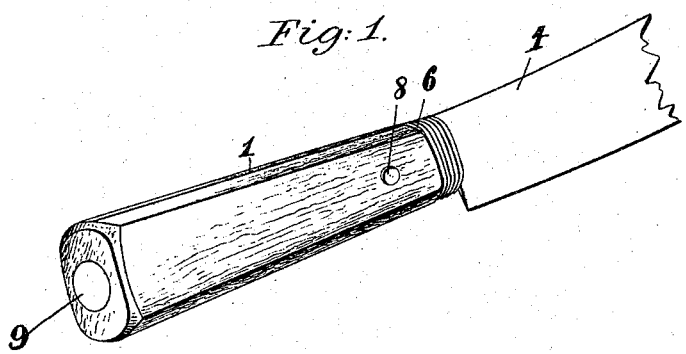
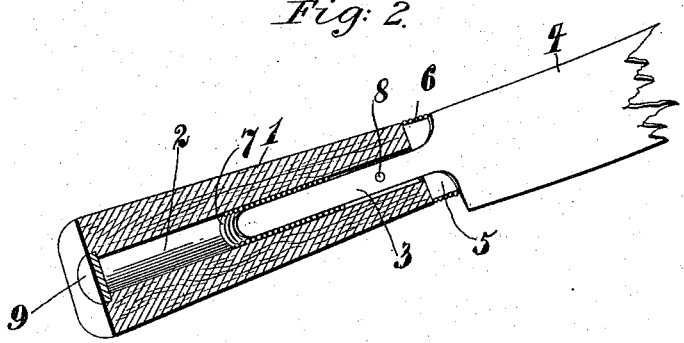
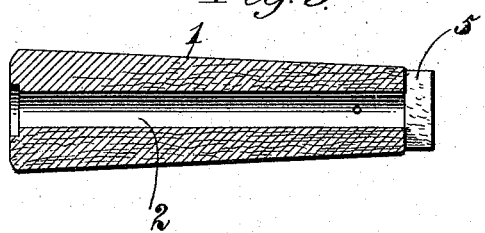
WITNESSES:
INVENTOR
W. B. Steeles.
BY
ATTORNEYS.

UNITED STATES PATENT OFFICE.

WILLIAM BRADLEY STEELES, OF NEW BRITAIN, CONNECTICUT.

CUTLERY-HANDLE.

SPECIFICATION forming part of Letters Patent No. 570,346, dated October 27, 1896.

Application filed April 25, 1896. Serial No. 589,057. (No model.)

*To all whom it may concern:*

Be it known that I, WILLIAM BRADLEY STEELES, of New Britain, in the county of Hartford and State of Connecticut, have invented new and useful Improvements in Cutlery-Handles, of which the following is a full, clear, and exact description.

This invention relates to handles for various forms of cutlery or similar utensils, such as forks, putty-knives, scrapers, &c.; and the object is to so construct the handle that unsightly openings in the handle at its junction with the blade will be avoided, and a further object is to provide a simple means to prevent the edge of the tang from cutting into or splitting the handle when pressure is brought upon the edge of the blade.

I will describe a handle embodying my invention and then point out the novel features in the appended claims.

Reference is to be had to the accompanying drawings, forming a part of this specification, in which similar characters of reference indicate corresponding parts in all the figures.

Figure 1 is a perspective view of a handle embodying my invention. Fig. 2 is a sectional view showing the manner of securing the blade in the handle, and Fig. 3 is a longitudinal section with the blade removed.

Referring to the drawings, 1 designates the handle of any suitable material, having a cylindrical perforation 2 extended through its body portion and designed to receive the tang 3 of a blade 4. The blade end of the handle has a transverse kerf 5, designed to receive the butt-end of the blade. This kerf corresponds in width to the thickness of the blade, and in case of a transversely-tapered blade the kerf will have its walls correspondingly inclined, so as to engage closely against the blade.

It will be observed that the perforation 2 terminates at the inner end of the kerf 5, thus avoiding the unsightly half-round openings at the sides of the blade which appear in the ordinary handles having the perforation starting from the kerfed end of the handle, and which must be covered up by a metal cap or ferrule having a cap portion, thus adding materially to the cost of the article. As the walls of the kerf engage the base portion of the blade, a strong support to prevent breaking at the junction with the tang is provided.

Any suitable ferrule may be placed around the kerfed end of the handle, but a ferrule is not absolutely necessary. I have here shown a ferrule 6, made of wire coiled and soldered together and not apt to corrode.

I will now describe the means for preventing the edge or edges of the tang from cutting into or splitting the handle when the blade meets with considerable resistance in cutting or by chopping, as is often done in meat-markets. This means consists of a tube 7, having an exterior diameter tightly fitting the perforation 2, and having an interior diameter substantially equal to the width of the tang which engages therein. Preferably the tube 7 is made of wire coiled into shape, as shown. By this construction the exterior surface will present a series of annular ridges that will have a tendency to press into the handle when the tang and tube are forced into engagement, thus locking the tube firmly in place and holding the tang in position.

The blade may be fastened by means of a pin or rivet 8, passing through the handle and tang, and of course any desired number of rivets may be employed.

In placing the parts together the tang may be inserted in the perforation 2 and the tube 7 inserted at the butt-end of the perforation and forced over the tang by means of a suitable tool, or the tube may be first inserted and the tang forced into it. After the parts are in place the butt-end of the perforation may be plugged by means of a plate 9 or otherwise.

Having thus described my invention, I claim as new and desire to secure by Letters Patent—

1. A cutlery-handle, having a kerf at one end to receive the butt portion of a blade and having a longitudinal perforation extended from the inner end of said kerf through the entire length of the handle, a tube in said perforation consisting of a wire wound spirally, the said tube being adapted to have its outer surface pressed into the interior of the handle by the insertion of the tang of a blade and a plug for the perforation at the butt-end of the handle, substantially as specified.

2. The combination of a handle having a kerf at one end to receive the butt portion of a blade, the walls of said kerf being inclined to engage the transverse taper of the blade, the said handle also having a longitudinal perforation extending from the base of the kerf through the opposite end of the handle, a tube in said perforation consisting of spirally-wound wire the spirals bearing one against another, and a non-rotary blade having a tang portion inserted in said tube, and by its pressure forcing the outer ridges of said tube into the material of the handle substantially as specified.

WILLIAM BRADLEY STEELES.

Witnesses:
 THOMAS H. BRADY,
 W. E. LATHAM.